United States Patent [19]

Nishiura

[11] Patent Number: 4,658,133

[45] Date of Patent: Apr. 14, 1987

[54] ROTATIONAL ANGLE DETECTING DEVICE WITH FULL CIRCUMFERENCE ILLUMINATION AND DETECTION

[75] Inventor: Masaharu Nishiura, Kanagawa, Japan

[73] Assignee: Fuji Electric Corporate Research and Dev. Inc., Yokosuka, Japan

[21] Appl. No.: 643,719

[22] Filed: Aug. 24, 1984

[30] Foreign Application Priority Data

Aug. 26, 1983 [JP] Japan .............................. 58-156032

[51] Int. Cl.[4] .......................................... G01D 5/34
[52] U.S. Cl. ........................... 250/231 SE; 250/237 G
[58] Field of Search ..................... 250/231 SE, 237 G; 340/347 P; 356/395

[56] References Cited

U.S. PATENT DOCUMENTS 3,549,897 12/1970 Blake ............................ 250/231 SE
3,757,128 9/1973 Vermeulen ...................... 250/237 G
4,496,835 1/1985 Boella et al. .................... 340/347 P Primary Examiner—David C. Nelms
Attorney, Agent, or Firm—Finnegan, Henderson, Farabow, Garrett and Dunner

[57] ABSTRACT

A rotational angle detecting device includes a rotatable plate attached to a shaft of a rotatable motor having a plurality of windows located at a first angular pitch and at a selected circumference with respect to the shaft, a light source, a stationary plate including first and second photoelectric detecting elements at a second pitch and the selected circumference, and electrical conductors connecting the first detecting elements in parallel and the second detecting elements in parallel such that the sum of the electrical signals produced by the photoelectric detecting elements are used to generate digital signals describing the rotational movement of the shaft with respect to the stationary plate.

7 Claims, 11 Drawing Figures

ROTATIONAL ANGLE DETECTING DEVICE WITH FULL CIRCUMFERENCE ILLUMINATION AND DETECTION

CROSS REFERENCE TO RELATED APPLICATION

This application is related to subject matter disclosed in copending patent application Ser. No. 643,717 filed Aug. 24, 1984, entitled ROTATIONAL ANGLE DETECTING DEVICE.

FIELD OF THE INVENTION

The present invention relates to a device for detecting rotational angle, rotational position, and the rotating speed of rotors and the like.

BACKGROUND OF THE INVENTION

A rotary encoder, a rotary pulse generator, and the like are devices for measuring rotational angles, rotational positions, and the rotating speed of rotors.

A rotary encoder converts an analog measurement of rotational angle to a digital measurement by generating pulse signals with frequencies and amplitudes that are proportional to analog values. The pulse signals can be used to measure a length along which a plate of stainless-steel is cut, to detect a displacement of an arm or the body of a robot, or to choose tools for a machining center through a measurement of rotational angles. The pulse signals can also be used to detect the speed of cars and the engines thereof, and to control rotational angles of dc-motors which are used in tape recorders, facsimile machines, printers and the like. Rotary pulse generators operate in the same manner as rotary encoders, and are preferably used for detecting the rotational angle of low speed rotors.

A general scheme of a conventional rotational angle detecting device is shown in FIG. 1. Reference numeral 4 designates a motor of which the rotational angle is to be detected. A rotating disk 3 is attached to a shaft 5 of the motor 4. A top plane view of the rotating disk 3 is shown in FIG. 2. Photowindows 16 and 26 are formed to have a constant pitch on two circumferences and to allow light to pass through them. Light emitting diodes 11 and 21 and photodetectors 12 and 22, such as photodiodes, are positioned in opposition to each other with the rotating disk 3 placed therebetween.

The light from the diodes 11, 21 passes through the photowindows 16 to reach the photodetector 12 intermittently as the disk 3 rotates. Consequently, the photodetector 12 generates an output current 17 having a sinusoidal waveform as shown in FIG. 3(a). The current 17 is reformed to be pulse trains 18 as shown in FIG. 3(b) through a device such a Schmitt trigger circuit (not shown in the figure).

Similarly, light passes through photowindows 26 and intermittently reaches the photodetector 22 to produce a pulse train 28 as shown in FIG. 3(b). The photodetectors 12 and 22 and the photowindows 16 and 26 are constructed so as to produce pulse trains 18 and 28 with a phase difference of 90 degrees. Such a construction is achieved by arranging the photodetectors 12 and 22 to have equal angular pitch and to have angular positions that differ by about ¼ of the angular pitch. In this arrangement of photodetectors, the photowindows are constructed so as to illuminate both photodetectors 12, 22 successively. Another construction may be used in which inner and outer photodetectors are arranged on the same angular position, while the photowindows are separated into an inner group and an outer group having equal pitch by angular positions different by about ¼ of the angular pitch.

FIG. 4 is a circuit diagram of a circuit which receives the pulse trains 18 and 28 of FIG. 3(b) and outputs rotation detecting pulses. A differential circuit 41 generates "1" outputs in response to the rising-edges of the pulse train 18 of FIG. 3(b) to cause an AND gate 42 to generate "1" outputs when the level of the pulse train 28 is "1". The outputs of the AND gate 42, which are supplied to a terminal 43, designate that the disk 3 is rotating in the direction of the arrow A in FIG. 2. Similarly, a differential circuit 44 generates "1" outputs in response to the falling-edges of the pulse train 18 supplied through an inverter 45. An AND gate 46 generates "1" outputs when the levels of the pulses of the pulse train 28 have "1" values. The outputs of the AND gate 46, which are supplied to a terminal 48, designate that the disk 3 is rotating in a direction opposite to that indicated by the arrow A. The outputs of an OR gate 47 designate that the disk 3 is rotating in one or the other direction.

If the number of the photowindows 26 is No, the number of the rotations after the start of the motor 4 is m, and the number of pulses outputted from the terminal 49 in this period is N, the following relation is obtained:

$$N/No = m + (N - mNo)/No \quad (1)$$

The value of $360 \times (N - mNo)$ designates an angular difference between the reference point of the motor 4 and that of a stationary plate for counting the number of rotations of the motor 4. The accuracy for measuring the angular difference is expected to be $360/N$ and, therefore, it is necessary to make No as large as possible in order to improve the accuracy. As for the sensitivities of the photodiodes and the solar batteries conventionally used as the photodetectors 12, 22, an output current density of only about 10–20 uA/cm$^2$ is obtained under the illuminance of 100 lux. An output current of at least 1 microamperes is required to reduce the expense of the detector and to facilitate its use as a control. Therefore, a lower limit on the size of the photowindows 6 exists from the viewpoint of utility.

If an evaluation is carried out by assuming that conventionally available photoreceivers 12, 22 are used, window areas of 3 mm×3 mm are required to obtain an output current of about 1 microamperes. A rotating disk of diameter of about 40 mm requires at least fifteen photowindows. In this case the measuring accuracy of angular difference is 24 degrees.

When a output current of at least 1 microamperes is obtained, it is usual that the output current is converted to a voltage drop of about 10 millivolts through a resistance of about 10 kOhms, which is further amplified to be about one hundred times larger through a conventional amplifier. For a conventional rotating disk which can generate 6000 pulses per revolution, the output current of the photodetector is 1 microampere×1/400 (=15/6000). Accordingly, further amplification of the output current of 400 times is required, making it difficult to achieve stable amplification and causing the amplifier circuit to be expensive.

Moreover, if the shaft 5 is attached to a point deviated from the center of the disk 3, the amount of light passing through the photowindows 6 will fluctuate. Therefore, pulsations will appear in the output current of FIG. 3(a), which have a period equal to the cycle of rotation of the disk 3. The pulsations cause distortion of the waveform generated by the reforming circuit, which in turn degrades the accuracy of detection of the rotational angle.

The rotary disk 3 is usually constructed by making slits to be used as the photowindows, or by printing patterns of opaque material on a transparent glass disk to form the photowindows at locations where the patterns do not exist. Irrespective of the process for forming the windows, fluctuations will occur in the shapes, the sizes, and the positions of the photowindows. Hence, a problem arises that the accuracy of detection of the rotational angle is adversely affected by the irregularities in the photowindows. Since the irregularities cause distortions in the waveform of the output currents from the photodetectors, the phase and the shape of individual pulses in the pulse train fluctuate.

SUMMARY OF THE INVENTION

Accordingly, an object of the present invention is a rotational angle detecting device, in which especially large amplification of the output current of the photodetectors is not required.

Another object of the present invention is a rotational angle detecting device which does not require a special circuit for stabilizing an amplification circuit.

Yet another object of the present invention is a rotational angle detecting device in which detecting accuracy is not adversely affected by deviations of the rotating disk from the stationary photodetecting plate or by fluctuations in the shapes, sizes, and positions of photowindows.

Still another object of the present invention is a reliable, inexpensive rotational angle detecting device.

The device of the present invention includes a rotating plate which is attached to an axis of a rotor and having a plurality of windows arranged to have a first angular pitch on at least a part of a selected circumference around the axis of the rotor. The device also includes at least one light source for illuminating at least two of the windows on the rotating plate at the same time. The device further includes a stationary detection plate which is opposed to the rotating plate and includes first and second photodetectors. Each photodetector includes a plurality of photodetecting segments for receiving light passing through the windows. The photodetecting segments of the first and second photodetectors are arranged to have a second angular pitch on at least a part of a circumference around the axis of the rotor. The second angular pitch is equal to the first angular pitch or a part of integer of the first pitch. At least two of the photodetecting segments of the first and the second photodetectors are connected in parallel with each other, respectively. The windows and the first and the second photodetectors are arranged so that light passing through the windows is received by the first and the second photodetectors at partially overlapping time periods.

DESCRIPTION OF THE PREFERRED EMBODIMENT

Figure 5:
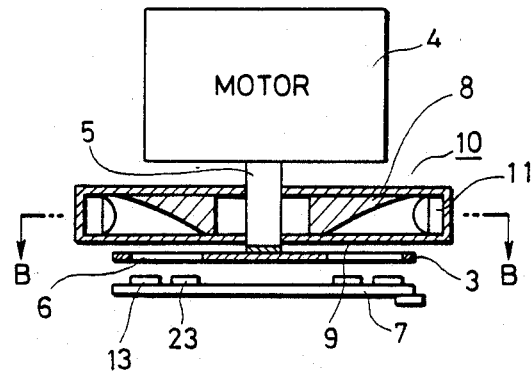
FIG. 5 is a partial cross-sectional side view of a rotational angle detecting device according to a preferred embodiment of the present invention.

FIG. 5 is a partial cross-sectional side view of a rotational angle detecting device according to a preferred embodiment of the present invention. A shaft 5 of a motor 4, the rotational angle of which is to be detected, is attached to a rotating disk 3. A stationary photodetecting plate 7 is located under and parallel to the rotating disk 3 and includes photodetectors 13 and 23 for receiving light passing through the photowindows 6. A light source 10 includes a light emitter 11 such as a light emission diode, a light reflector 8, and a light diffusing plate 9.

Figure 6:
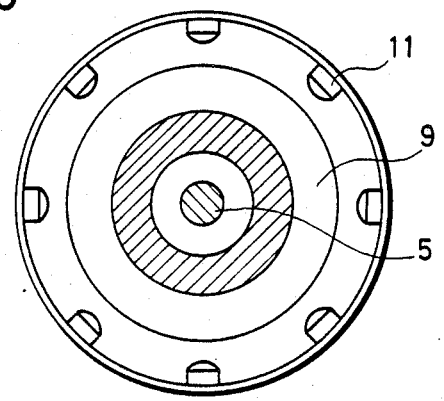
FIG. 6 is a cross-sectional view taken along a line B—B in FIG. 5.

FIG. 6 shows a cross-sectional view taken along a line B—B in FIG. 5, in which an arrangement of the light emitter 11 and the light diffusing plate 9 is shown. The number of light emitters 11 and the shape of the light reflector 8 are determined so as to illuminate the upper surface of the rotating disk 3 uniformly. The light diffusing plate 9 is used to improve the uniformity of the illumination.

Figure 7:
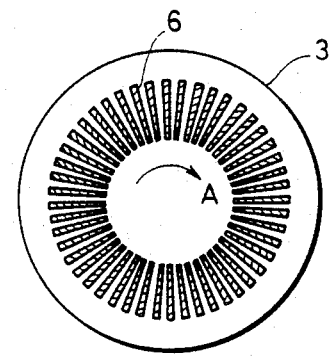
FIG. 7 is a top plane view of a rotating disk 3 of the device of FIG. 5.
Figure 8:
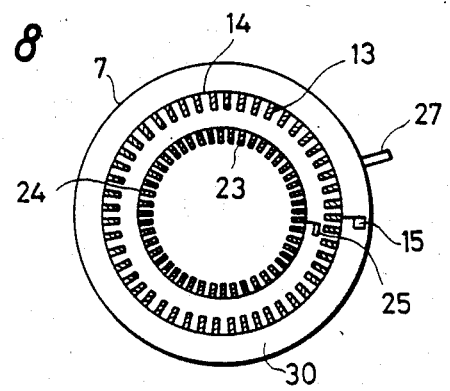
FIG. 8 is a top plane view of a stationary photodetecting plate 7 of the device of FIG. 5.

FIGS. 7 and 8 are top plane views of the rotating disk 3 and the stationary plate 7, respectively. The rotating disk 3 includes a plurality of photowindows 6 arranged to have a constant angular pitch on a circumference around the axis 5 of the motor 4. The stationary photodetecting disk 7 includes an outer photodetector 13 and an inner photodetector 23. Each of the photodetectors 13 and 23 includes a plurality of photodetector segments arranged to have a constant angular pitch and different angular positions with respect to each other. As the disk 3 rotates in the direction of the arrow A, light passing through the photowindows 6 starts to illuminate a segment of the photodetector 13 after it starts to illuminate a segment of the photodetector 23. The light also stops illuminating the segment of the photodetector 13 after it stops illuminating the segment of the photodetector 23. The light then starts to illuminate the next segment of the photodetector 23, and successive illumination is carried out repeatedly.

The photowindows 6 on the rotating disk 3 are made by using conventional processes. For instance, they are made as slits formed on a metallic thin plate by selective etching. They can also be made by printing patterns of opaque material on a transparent glass disk to provide photowindows where the patterns do not exist.

Figure 9:
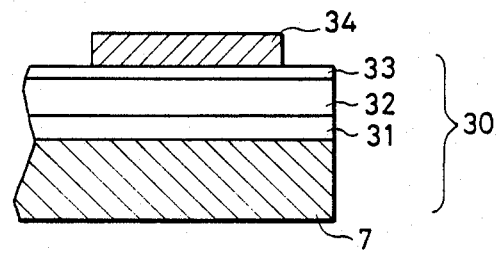
FIG. 9 is a fragmentary cross-sectional view of photodetectors 13 and 23 of the plate of FIG. 8.

FIG. 9 shows a fragmentary cross-sectional view of the photodetectors 13 and 23, which are made as follows. First, an amorphous silicon layer 30 is formed on the electrical conductive plate 7, for example, a stainless steel plate. The layer 30 is formed by depositing a p-type layer 31 of a thickness of about 500 A, a non-doped layer 32 of a thickness of about 0.5 um, and a n-type layer 33 of a thickness of about 100 A by successive glow discharges.

A transparent electrode 34 having the same radial pattern as that of the photowindows 6 on the rotating disk 3 is formed on the layer 30. The transparent electrode 34 is formed by patterning a film of Indium-Tin oxide deposited in vacuum and using conventional photo etching technique.

Only the light passing through the transparent electrode 34 can generate electrical output signals. The other part of light illuminating the amorphous silicon layer 30 where the transparent electrode 34 does not exist cannot generate electrical signals due to the high resistivity of the layer 30. A plurality of transparent electrodes 34, formed separately from each other, are connected in parallel by depositing metal electrodes 14 and 24 to be overlapped partially on the transparent electrodes 34, as shown in FIG. 8. The metal electrodes 14 and 24 are also connected to the output terminals 15 and 25, respectively. An electrode 27 is another output terminal.

In the construction mentioned above, all of the photowindows 6 are opposed to corresponding segments of the photodetectors 13 and 23 at the same time in every pitch along the circumferential direction as the disk 3 rotates. This causes the generation of a voltage simultaneously in all the segments of the photodetectors 13 and 23.

The magnitude of the photovoltage decreases as the photowindows 6 moves away from complete superimposition over the segments of the photodetectors 13 and 23 in the circumferential direction, causing the output current to have a cycle proportional to the pitch.

The rotational angle detecting device mentioned above is different from the conventional device in that its output current is equal to the sum of the output currents generated by each segment of the photodetectors 13, 23, since each segment of the photodetectors 13, 23 is arranged to receive light passing through corresponding photowindows 16 at the same time, and each segment of the respective photodetectors 13, 23 is connected in parallel with each other. As a consequence, an output current 7 of a desired magnitude can be obtained by making the sum of the areas of each segment of the respective photodetectors 13, 23 to be larger than an appropriate lower limit, for instance 0.1 cm². As a result, especially large amplification of the output current of the photodetectors is not required, and any additional special circuit to achieve stable large amplification is not required.

Figure 3A:
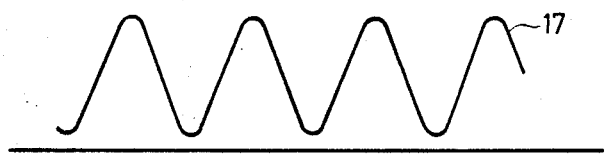
FIGS. 3(a) and 3(b) are waveform charts produced by photodetectors 12 and 22 of the device of FIG. 1.
Figure 3B:
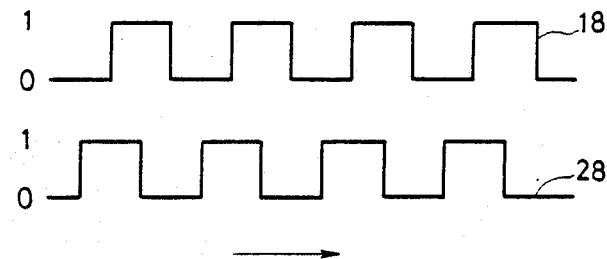
Figure 4:
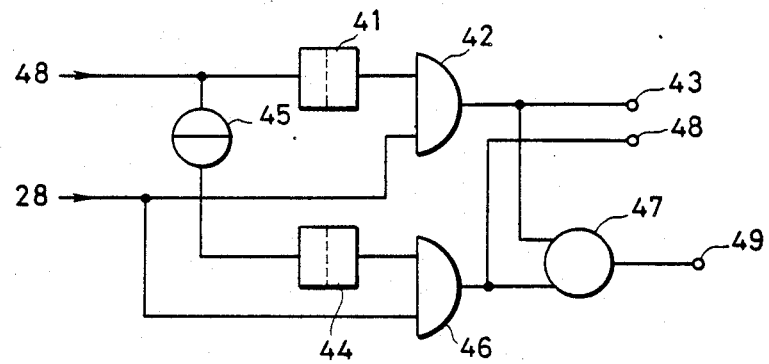
FIG. 4 is a circuit diagram of a circuit which receives output current from the photodetectors of the device of FIG. 1.

Output currents obtained from the output terminals 15, 25, and 27 are reformed to provide pulse trains similar to pulse trains 18 and 28 as shown in FIG. 3(b). The pulse trains are supplied to a circuit such as shown in FIG. 4, to provide detected rotational angle, rotational direction, rotational speed, etc. The phases of the pulse trains 18 and 28 are preferably adjusted to have a phase difference ranging from 45 degrees to 135 degrees.

Figure 10:
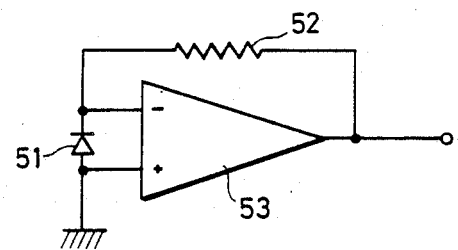
FIG. 10 is an equivalent circuit including the photodetectors 13 and 23 of FIG. 9.

Devices according to the present invention have been manufactured to include a rotating disk having a diameter of 40 mm and having 800 photowindow slits of 50 um width and 1.5 mm length. A stationary photodetecting plate has been used which included inner and outer photoconductors each having 800 segments of transparent electrodes with the same radial pattern as shown in FIG. 8 on an amorphous silicon layer. Each segment of the inner and outer photoconductors was arranged to have a different angular position by 0.11 degree. The rotating disk and the stationary photodetecting plate were parallel to each other and separated by a distance of 1 mm. An output current having a peak value of 6 um was obtained using the photodetectors of FIG. 9 as the elements 51 in the circuit of FIG. 10 and by using a resistance 52 and an operational amplifier 53. In the devices manufactured as described above, all of the output currents had the same period, and no pulsation was observed in the output currents. This means that variations in the output current of the photodetectors due to positioning errors between the rotating disk and the stationary plate and to irregularities in the shapes, sizes, and positions of the photodetectors are balanced.

Although not shown in the drawings, the number of the photodetectors 13 and 23 may be twice, three times ... or n (integer) times the number of photowindows. In this case, all of the photowindows 6 oppose only a fraction of n of the photodetectors 13, 23 at the same time. This leads to improvements in the accuracy of the detected rotational angle by n times without changing the scheme of the photowindows and the magnitude of the output currents.

It is preferable that the top surface of the rotating disk 13 is illuminated uniformly by using many light sources 11. However, when this is difficult from a practical viewpoint, at least two light sources 11 are preferably used.

Figure 1:
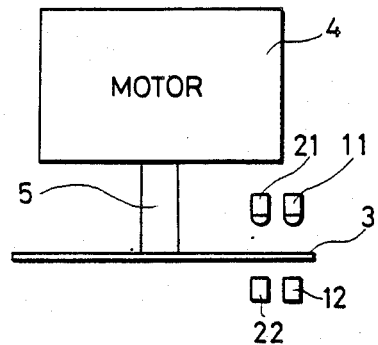
FIG. 1 illustrates a conventional rotational angle detecting device.
Figure 2:
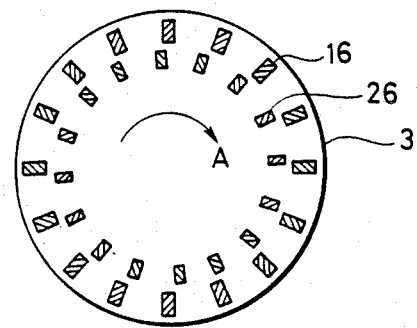
FIG. 2 is a top plane view of a rotating disk 3 of the device of FIG. 1.

Although one example of an arrangement of photowindows and photodetectors has been shown, other arrangements may be used. For example, inner and outer photodetectors may be arranged on the same angular position, while photowindows can be separated into an inner group and an outer group to have equal angular pitch and different angular positions as shown in FIG. 2. Also, the photodetectors may be arranged on only a part of the circumference. Alternatively, the photowindows may be arranged on a part of circumference in the case when the photodetectors are arranged on the whole circumference.

While the salient features of the present invention have been described with reference to the drawings, it should be understood that the preferred embodiment described herein is susceptible of modifications and alterations without departing from the spirit and scope of the following claims.

What is claimed is:

1. A rotational angle detecting device comprising:
   a rotatable plate adapted to be attached to a shaft of a rotatable rotor and having a surface including a plurality of windows arranged at a first angular pitch on the entire circumference around the axis of the shaft;
   a light source for uniformly illuminating all of said windows on said rotatable plate at the same time;
   a stationary detector plate having a surface opposed to said surface of said rotatable plate, said surface of said detector plate including a first photodetector comprising a plurality of first detecting segments disposed around the entire circumference at a second angular pitch for receiving light from said light source passing through said windows on said rotating plate and for generating a first electrical signal with an amplitude corresponding to the intensity of said received light, and a second photodetector comprising a plurality of second detecting segments disposed around the entire circumference at said second angular pitch for receiving light from said light source passing through said windows on said rotating plate and for generating a second electrical signal with an amplitude corresponding to the intensity of said received light wherein the spacing of said windows and said first and second detecting segments is such that light is completely interrupted by rotation of said disk;

a first conductor electrically connecting said first detecting segments in parallel to generate a first combined output signal comprising the sum of each of said first electrical signals; and a second conductor electrically connecting said second detecting segments in parallel to generate a second combined output signal comprising the sum of each of said second electrical signals.

2. A rotational angle detecting device according to claim 1 wherein said second pitch is equal to said first pitch.

3. A rotational angle detecting device according to claim 2 wherein said light source illuminates adjacent first and second detecting segments during a portion of the rotation of said rotatable plate.

4. A rotational angle detecting device according to claim 3 wherein each of said first and second detecting segments comprises an amorphous silicon layer formed on an electrically conductive plate.

5. A rotational angle detecting device according to claim 4 wherein said amorphous silicon layer comprises:
a p-type layer formed on said conductive plate;
a non-doped layer formed on said p-type layer; and
a N-type layer formed on said non-doped layer.

6. A rotational angle detecting device according to claim 1 wherein said light source comprises a plurality of light emitting diodes which emanate light of uniform intensity.

7. A rotational angle detecting device according to claim 1 wherein said second pitch is a fraction of said first pitch.

* * * * *